(12) United States Patent
Johnson et al.

(10) Patent No.: US 7,244,081 B2
(45) Date of Patent: Jul. 17, 2007

(54) DRILL ADAPTER FOR DRILL HAVING CENTRAL AND LATERAL CUTTING INSERTS

(75) Inventors: William Bennett Johnson, Machesney Park, IL (US); John Carlos Lundholm, Machesney Park, IL (US)

(73) Assignee: Ingersoll Cutting Tool Company, Rockford, IL (US)

( * ) Notice: Subject to any disclaimer, the term of this patent is extended or adjusted under 35 U.S.C. 154(b) by 232 days.

(21) Appl. No.: 10/936,697

(22) Filed: Sep. 9, 2004

(65) Prior Publication Data
US 2006/0051172 A1  Mar. 9, 2006

(51) Int. Cl.
*B32B 51/02* (2006.01)
(52) U.S. Cl. .................. 408/224; 408/144; 408/233
(58) Field of Classification Search ........... 408/144, 408/223–225, 227, 230–233, 713
See application file for complete search history.

(56) References Cited

U.S. PATENT DOCUMENTS

| | | | | |
|---|---|---|---|---|
| 1,940,220 A | * | 12/1933 | McGrath | 408/59 |
| 2,294,969 A | * | 9/1942 | Engvall et al. | 408/224 |
| 4,194,862 A | * | 3/1980 | Zweekly | 408/224 |
| 4,248,555 A | * | 2/1981 | Satou | 408/225 |
| 4,340,327 A | * | 7/1982 | Martins | 408/59 |
| 4,687,387 A | * | 8/1987 | Roos | 408/144 |
| 5,161,726 A | * | 11/1992 | Francis | 228/19 |
| 5,423,640 A | | 6/1995 | Lindblom et al. | |
| 5,425,604 A | * | 6/1995 | Scheer et al. | 408/83 |
| 5,452,971 A | * | 9/1995 | Nevills | 408/230 |
| 5,704,740 A | * | 1/1998 | Ebenhoch et al. | 408/59 |
| 5,904,455 A | * | 5/1999 | Krenzer et al. | 408/144 |
| 5,957,631 A | | 9/1999 | Hecht | |
| 6,012,881 A | * | 1/2000 | Scheer | 408/227 |
| 6,059,492 A | | 5/2000 | Hecht | |
| 6,109,841 A | | 8/2000 | Johne | |
| 6,783,307 B2 | * | 8/2004 | Lindblom | 408/226 |
| 6,984,094 B2 | * | 1/2006 | Nuzzi et al. | 408/224 |
| 2004/0091329 A1 | * | 5/2004 | Chang | 408/233 |
| 2005/0084343 A1 | * | 4/2005 | Delett | 408/59 |

FOREIGN PATENT DOCUMENTS

| | | | |
|---|---|---|---|
| EP | 1358979 A2 | * | 11/2003 |
| GB | 2018644 A | * | 10/1979 |

* cited by examiner

*Primary Examiner*—Dana Ross
(74) *Attorney, Agent, or Firm*—Womble Carlyle

(57) ABSTRACT

A drill adapter has a resilient insert retaining portion at one end, a drive stem at the second end, and an adapter seating portion between the two. The insert retaining portion includes first and second resilient clamping members which are rotationally 180° apart. The resilient clamping members are separated by a narrow slit which communicates with an internal through bore extending across a diameter of the insert retaining portion. The seating portion includes a pair of planar abutment surfaces which are supported by a lower seating surface formed on the drill adapter seating portion, when the drill is assembled. The drive stem is provided with a pair of longitudinally extending drive slots. When inserted into an end bore formed at the operative end portion of a drill shaft, the drive slots receive complementary guides formed on an inner wall of the end bore.

32 Claims, 11 Drawing Sheets

DRILL ADAPTER FOR DRILL HAVING CENTRAL AND LATERAL CUTTING INSERTS

RELATED APPLICATIONS

None

FIELD AND BACKGROUND OF THE INVENTION

The present invention relates to metal cutting tools and metal drills in particular. More particularly, it pertains to such drills having cutting end portions at which a plurality of cutting inserts of different types are positioned.

SUMMARY OF THE INVENTION

In one aspect, the present invention is directed to a metal drill adapter having a central axis. The metal drill adapter includes a cutting insert retaining portion connected to a drive stem. The drive stem comprises a cylindrical outer surface in which are formed a pair of elongated drive slots that extend along the central axis and communicate with a bottom surface of the drive stem, and a bearing surface between the pair of elongated drive slots.

The cutting insert retaining portion may comprise identical first and second resilient clamping members which are rotationally 180° apart, the first and second resilient clamping members being separated by a slit which communicates with an internal through bore extending across a diameter of the cutting insert retaining portion.

In another aspect, the present invention is directed to such a metal drill adapter in combination with a cutting insert. The cutting insert has at least one cutting edge provided with an associated rake surface and the drill adapter has a curved circumferential sidewall, the associated rake surface merging with the curved circumferential sidewall.

In yet another aspect, the present invention is directed to such a metal drill assembly that includes the drill adapter described above, and a drill shaft. The drill shaft has a longitudinal axis and a cutting portion provided with an end bore that is coaxial with the longitudinal axis. The end bore has an inner wall provided with a plurality of elongated convex guides that extend along the longitudinal axis. In the assembled position, the drive stem is positioned in the end bore with the elongated convex guides received into the elongated drive slots.

The drill adapter further may comprise a pair of planar abutment surfaces formed on an underside of the cutting insert retaining portion. The planar abutment surfaces may extend radially outward of the drive stem and abut an axially directed seating surface of the drill shaft, the end bore being formed in the axially directed seating surface.

The drill shaft may be provided with a set screw bore extending in a direction transverse to the longitudinal axis, the set screw bore connecting an outer surface of the drill shaft with the end bore. The drive stem may be provided with a bearing surface formed in the drive stem's cylindrical outer surface, between the pair of elongated drive slots. Additionally, the drill assembly may further comprise a set screw that occupies the set screw bore and applies a force against the bearing surface.

In still another aspect, the present invention is directed to a metal drill including the aforementioned drill shaft, drill adapter and a cutting insert retained in the cutting insert retaining portion of the drill adapter.

In still another aspect, the present invention is directed to a metal drill having a longitudinal axis. The metal drill has a drill shaft provided with a cutting portion having an end bore that is coaxial with said longitudinal axis, the drill shaft further having first and second lateral cutting insert pockets formed on either side of the end bore. The metal drill also includes a drill adapter having a cutting insert retaining portion and a drive stem, the drive stem being removably retained in the end bore. A cutting insert of a first type is screwlessly retained in the cutting insert retaining portion. In addition, first and second indexable cutting inserts of a second type are secured to respective first and second lateral cutting insert pockets and are positioned on either side of said cutting insert of a first type.

In such a metal drill, the end bore may have an inner wall provided with a plurality of elongated convex guides that extend along the longitudinal axis. The drive stem may comprise a cylindrical outer surface in which are formed a pair of elongated drive slots that extend along the central axis and communicate with a bottom surface of the drive stem, and a bearing surface between the pair of elongated drive slots. The drive stem may be positioned in the end bore with the elongated convex guides received into the elongated drive slots.

BRIEF DESCRIPTION OF THE DRAWINGS

The invention will now be described, by way of example only, with reference to the accompanying drawings in which:

FIG. 3b is a bottom perspective view of the central cutting insert of FIG. 3a;

FIG. 3c is a bottom view of the central cutting insert of FIG. 3a;

FIG. 4b is a side view of the drill adapter of FIG. 4a;

FIG. 4c is a perspective view of the drill adapter of FIG. 4a having mounted thereon the central cutting insert of FIG. 3a;

FIG. 4d is a top view of the drill adapter of FIG. 4a;

FIG. 4e is a bottom view of the drill adapter of FIG. 4a;

DETAILED DESCRIPTION OF THE INVENTION

Figure 1:
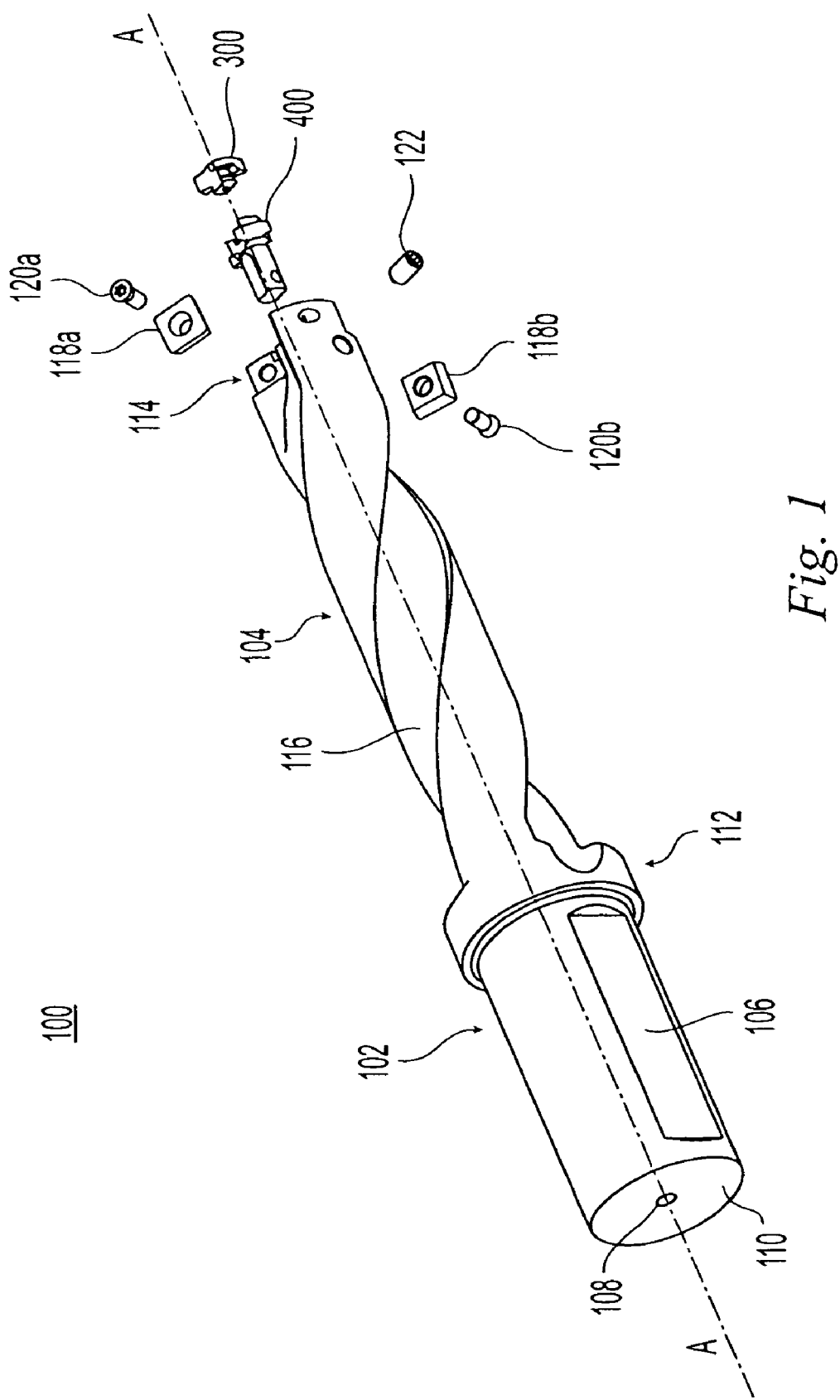
FIG. 1 is a perspective view of an exploded view of a drill in accordance with the present invention.

FIG. 1 shows an exploded view of a preferred embodiment of a drill 100 in accordance with the present invention. The drill 100 includes a handle 102 attached to a fluted drill shaft 104.

The handle 102 and the drill shaft 104 may have unitary construction and be formed from one continuous material. Alternatively, the handle and shaft are formed as separate pieces provided with mating threads so that they can be screw-coupled to one another.

The handle 102 is provided with an indexing surface 106 for orienting the handle when it is inserted into a chuck or other device for holding the drill 100. A fluid inlet aperture 108 is provided at the bottom end 110 of the drill handle 102 for the introduction of water or other coolant or lubricant that passes along the length of the drill and exits at fluid outlet apertures 210a, 210b formed on the operative end surface of the drill shaft 104.

The drill shaft 104 has a longitudinal axis A and extends in an axially forward direction of the drill from a base portion 112 proximate the handle 110 to a cutting end portion 114 distal from the handle 110. When assembled, the cutting end portion 114 of the drill is provided with first and second lateral cutting inserts 118a, 118b secured by respective first and second clamping screws 120a, 120b. In a preferred embodiment, the lateral cutting inserts 118a, 18b are square-shaped and four-way indexable. It is noted however, that the lateral cutting inserts may take on other shapes such as rhomboidal, parallelpiped or even others. The cutting end portion 114 is further provided with a central cutting insert 300 that is seated in a removable drill adapter 400.

The removable drill adapter 400 is retained in an end bore 202 formed at the drill shaft's cutting portion 204. The end bore 202 is coaxial with the longitudinal axis A. A set screw bore 218 extends in direction transverse to the longitudinal axis A and communicates between an outer cylindrical wall of the drill shaft's cutting portion 204 and the end bore 202. A leading end of a set screw 122 that is inserted into the set screw bore 218, abuts a concave bearing surface 402 formed on an external cylindrical wall of the adapter 400, when the adapter is positioned in the end bore. This draws the adapter's drive stem 404 slightly downward (i.e., axially rearward) and also presses the adapter's drive stem 404 against a far wall 460 of the end bore 202, the far wall 460 being opposite the set screw bore 218. The pressure applied by the set screw thereby prevents accidental or inadvertent removal of the adapter 400 from the end bore 202.

Figure 2:
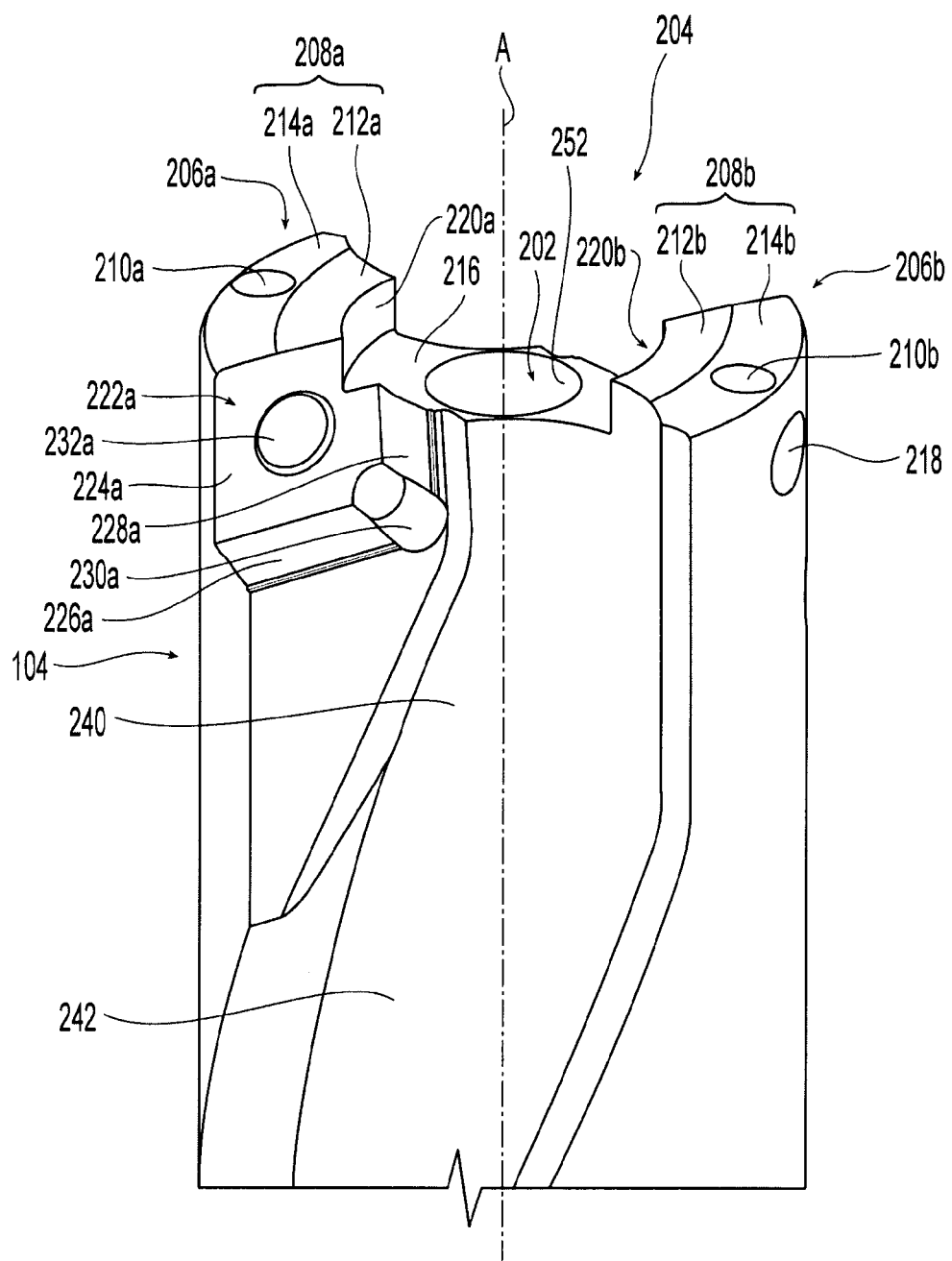
FIG. 2 is a perspective view of the cutting end portion of the drill shaft.
Figure 3A:
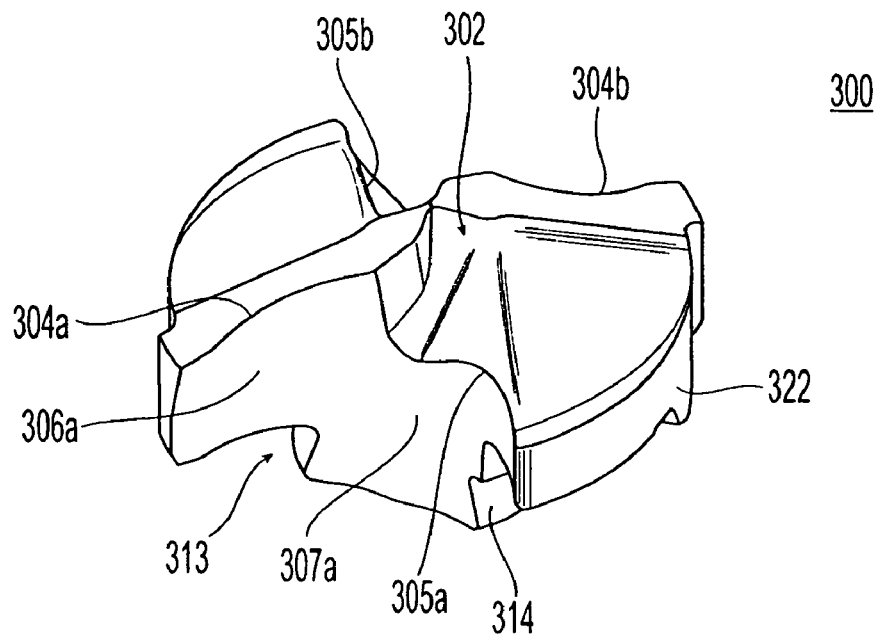
FIG. 3a is a top perspective view of a central cutting insert used in conjunction with the present invention.
Figure 3B:
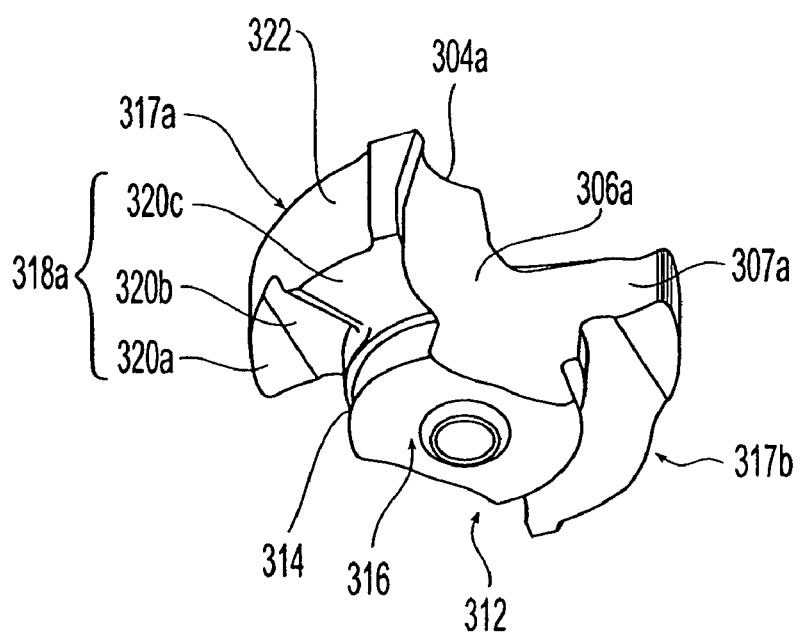
Figure 3C:
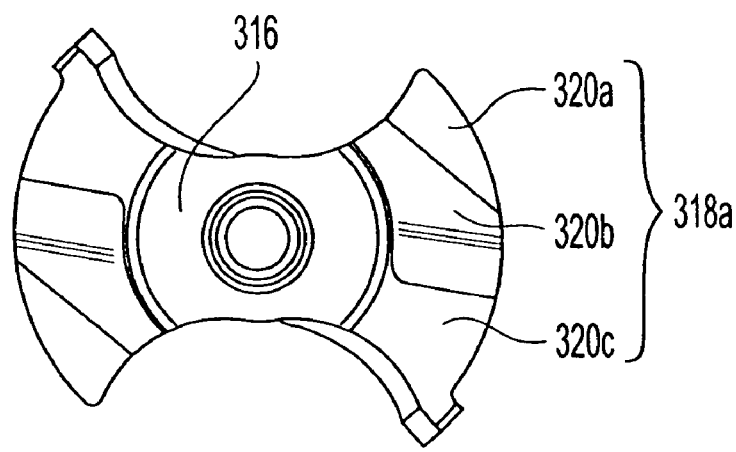

As best seen in FIG. 2, the drill shaft's cutting portion 204 has a pair of arcuate projections 206a, 206b that form the axially forwardmost portions of the drill shaft 104. The arcuate projections 206a, 206b are provided with axially directed upper axial surfaces 208a, 208b, respectively. In a preferred embodiment, each upper axial surface 208a, 208b comprises an arcuate radially inner seating segment 212a, 212b and an arcuate radially outer seating segment 214a, 214b.

An axially forward facing fluid outlet aperture 210a, 210b is formed in each of the upper axial surfaces 208a, 208b to deliver a coolant or lubricant to a workpiece. Furthermore, an outer face of at least one of the projections, in this case projection 206b, is provided with a set screw aperture 218 configured to receive the set screw 122 for securing the adapter 400 when it is positioned in the end bore 202, as discussed further below.

The drill shaft 104 is further provided with axially directed lower seating surface 216 that is radially inward of, and axially recessed relative to, the axially directed upper axial surfaces 208a, 208b. The lower seating surface 216 is connected to the upper axial surfaces 208a, 208b on opposite sides of the end bore 202 via a pair of opposing, radially inwardly directed circumferential seating walls 220a, 220b, respectively. The lower seating surface 216, which is substantially planar, surrounds the end bore 202; alternatively, it can be said that the end bore 202 is formed in the lower seating surface 216.

First and second lateral cutting insert pockets 222a, 222b, which rotationally are 180° apart around the longitudinal axis A, are formed at the operative end of the drill shaft 104. The pockets are identical in construction so only one of these is described. Pocket 222a has a pocket base 224a defining a plane that does not contain the longitudinal axis, but is substantially parallel thereto. The pocket 222a also comprises an axially directed rear wall 226a and a radially directed side wall 228a. The rear wall 226a and side wall 228a are connected by an arcuate relief channel 230a that extends for the depth of the pocket, at a radially inward and axially rearward corner of the pocket 222a. The relief channel 230a obviates the need to form that corner of the insert pocket 224a with very fine tolerances so as to accommodate the lateral cutting inserts.

Figure 10:
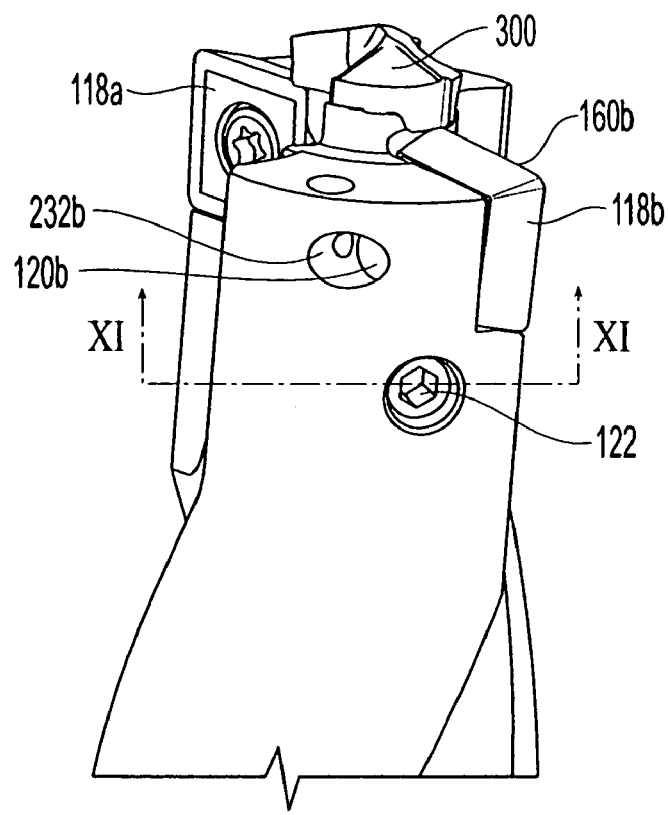
FIG. 10 is a perspective of the assembled cutting end portion.

The pocket 222a further comprises a threaded bore 232a formed in the pocket base 224a. As seen in FIG. 10, threaded bore 232b passes through the pocket base and communicates, on the other side, with an external surface of the drill shaft's cutting portion 204. When the lateral cutting insert 118a is seated in the pocket 222a, the clamping screw 120a is inserted through a through bore of the lateral cutting insert 118a and screwed into the threaded pocket bore 232a to thereby secure the insert.

Immediately below the end bore 202 is an upper chip gullet 240 which extends rearwardly in the axial direction to just past the rear wall 226a of the insert pocket 222a where it merges with a main flute portion 242 of the drill shaft.

The central cutting insert 300 has a cutting portion 302 at a first, upper end and a mounting portion 312 at a second, lower end and a peripheral surface 322 connecting the two. The cutting portion comprises a pair of identical, curved major cutting edges 304a, 304b which are rotationally 180° apart and a pair of curved minor cutting edges 305a, 305b which also are rotationally 180° apart. Below major cutting edge 304a is a major insert rake surface 306a and below minor cutting edge 305a is a minor insert rake surface 307a. During drilling operations, chips that are formed by cutting edges 304a, 305a, initially flow down the rake surfaces 306a, 307a, respectively. It is understood that curved cutting edges 304b, 305b have corresponding rake surfaces, as well.

The mounting portion 312, which comprises the underside of the central cutting insert 300, includes a central mounting member 313 with a side wall 314 and a bottom surface 316. The mounting portion 312 also includes identical clamping wing portions 317a, 317b. Since the clamping wing portions are identical, only one of these is described. Clamping wing portion 317a includes an abutment surface 318a comprising a plurality of component abutment surfaces 320a, 320b 320c. First 320a, second 320b and third 320c component abutment surfaces mate with complementary component insert support surfaces 420a, 420b, 420c, respectively, the latter being provided on the resilient upper support portion of the drill adapter 400.

With reference to FIGS. 4a, 4b, 4c, 4d and 4e, the drill adapter 400 comprises a resilient insert retaining portion 410 at a first end thereof, a drive stem 404 at a second end thereof and a seating portion 403 between the two. Preferably, the insert retaining portion 410, the drive stem 404 and the seating portion 403 have unitary construction, the entire drill adapter 400 being formed from a single continuous piece of material.

The insert retaining portion 410 comprises identical first and second resilient clamping members 412a, 412b, respectively, which are rotationally 180° apart. The clamping members 412a, 412b are separated by a narrow slit 414 which communicates with an internal through bore 416 extending across a diameter of the insert retaining portion 410, thereby imparting resilience thereto.

Clamping member 412a includes a lower peripheral outer surface 430a that constitutes the radially outermost portion of the drill adapter 400, and an insert support member 432a. Clamping member 412b similarly includes a lower peripheral outer surface 430b and insert support member 432b. Since the resilient clamping members 412a, 412b are identical, only one is now described.

Insert support member 432a comprises an upper peripheral outer surface 434a that is radially inward of, and axially forward of, the lower peripheral outer surface 430a. The insert support member 432a further comprises an axially directed insert support surface 418a comprising component insert support surfaces 420a, 420b, 420c. First, second and third component insert support surfaces 420a, 420b, 420c abut against the central cutting insert's first, second and third abutment surfaces 320a, 320b, 320c, respectively, when the central cutting insert 300 is seated in the drill adapter.

The insert support member 432a further comprises a radially inwardly facing support surface 448a which contacts the side wall 314 belonging to the central mounting member 313 of the central cutting insert 300.

In the present context, the insert retaining portion 410 is "resilient" in the sense that the clamping members 412a, 412b may move away from each other, upon application of a separating force. Such a separating force may be of the sort provided by the central mounting member's side wall 314 pushing against the radially inward facing support surface 448a formed on the insert support member 432a.

The design and assembly of the central cutting insert 300 and the insert retaining portion 410 is described in additional detail in U.S. Pat. No. 6,059,492, whose contents are incorporated by reference. Briefly, however, the central mounting portion 313 of the insert 300 is placed above the center of the insert retaining portion 410 with the clamping wing portions 317a, 317b partially overlapping the corresponding insert support members 432. The insert 300 is then twisted with the result that side wall 314 of the central mounting portion 313 abuts and pushes radially outwardly against the radially inward facing support surface 448a, while at the same time, the cutting insert's first, second and third abutment surfaces 320a, 320b, 320c ride onto the component insert support surfaces 420a, 420b, 420c. Thus, the central cutting insert 300, which is the axially forwardmost portion of the assembled drill, is screwlessly (i.e., without the use of a screw) retained in the cutting insert retaining portion 410, in this instance by bayonet fit.

Figure 4A:
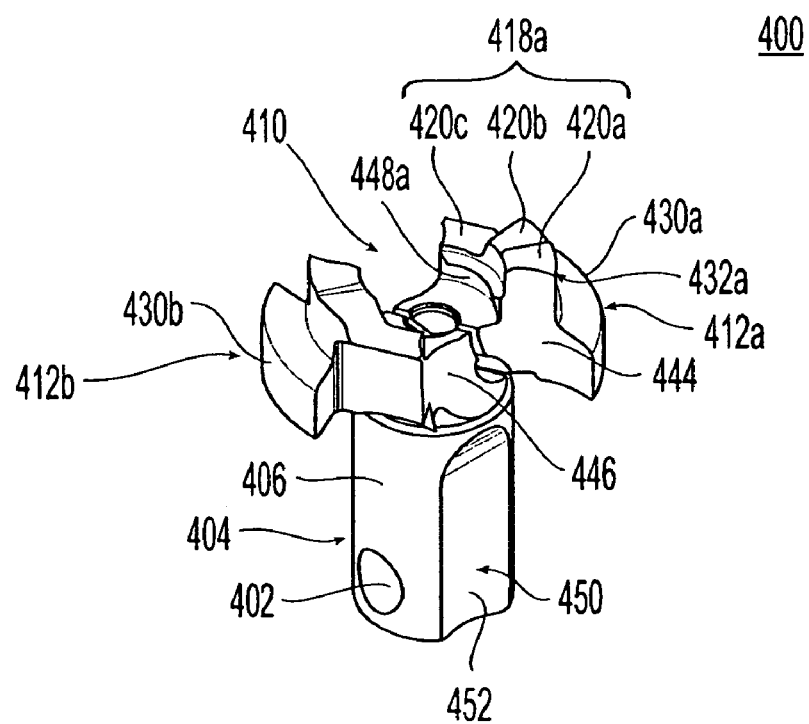
FIG. 4a is a perspective view of a drill adapter in accordance with the present invention.
Figure 4B:
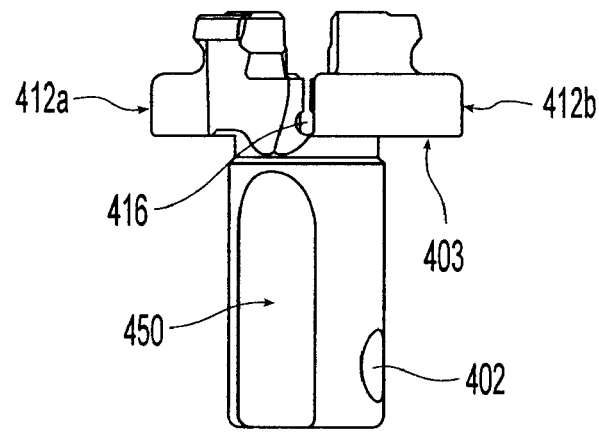
Figure 4C:
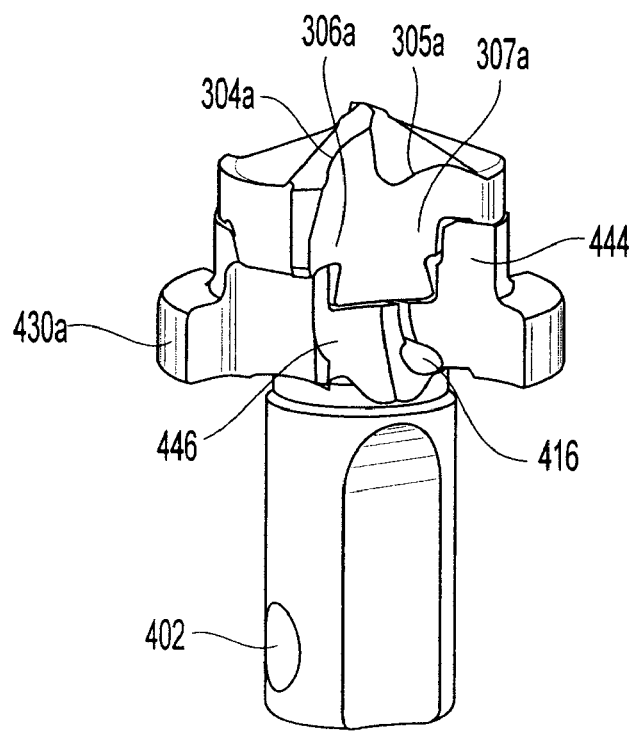
Figure 4D:
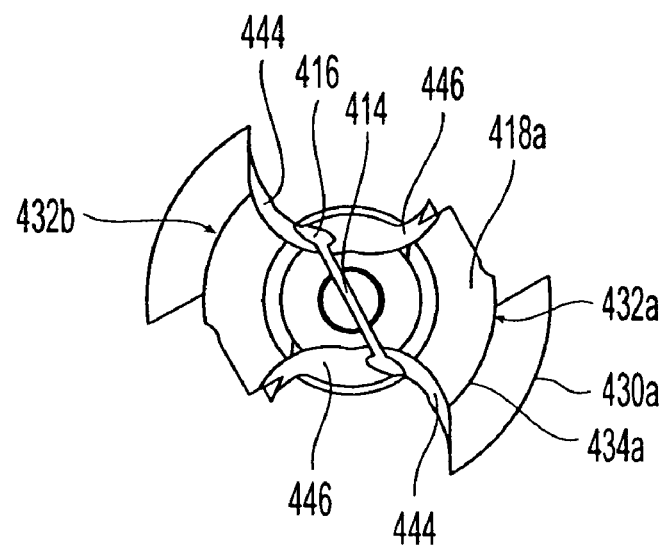
Figure 4E:
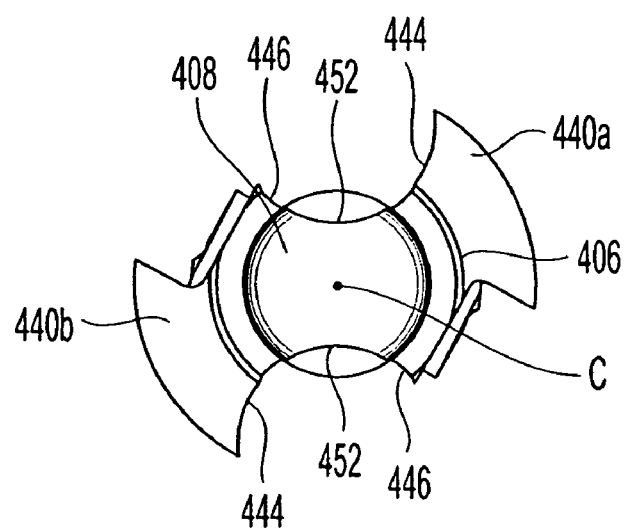

As seen in FIG. 4e, the underside of the insert retaining portion 410 forms the adapter's seating portion 403. Seating portion 403 comprises a pair of planar abutment surfaces 440a, 440b which extend radially outward of the drive stem 404. When the drill 100 is assembled, the planar abutment surfaces 440a, 440b abut and are supported, by the drill's lower seating surface 216. Also, in the assembled condition, the lower peripheral outer surfaces 430a, 403b face the opposing, radially inwardly directed circumferential seating walls 220a, 220b, respectively.

Resilient clamping members 412a, 412b both have first and second curved circumferential sidewalls 444, 446, respectively. The first circumferential sidewall 444 of one clamping member 412a, 412b is separated from the second circumferential sidewall 446 of the other clamping member 412b, 412a by the slit 414. As seen in the figures, the first circumferential sidewall 444 of resilient clamping member 412a extends in the axial direction between a first end of the axially directed insert support surface 418a where first component insert support surface 420a ends, and the planar abutment surface 440a formed on the underside of the of the upper clamping portion 410. The second circumferential sidewall 446 of resilient clamping member 412a extends in the axial direction between a second end of the axially directed insert support surface 418a where the third component insert support surface 420c begins, and the junction between the resilient clamping member and the drill adapter's drive stem 404.

The drill adapter's drive stem 404 has a cylindrical outer wall 406 terminating at a lower end of the drill adapter 400 in a bottom surface 408. A pair of elongated drive slots 450 extending along the central axis C of the drill adapter 400 are formed in the cylindrical outer wall 406 and communicate with the bottom surface 408 of the drill adapter. In a preferred embodiment, the drive slots 450 are rotationally 180° apart and face in opposite directions. The concave bearing surface 402 is formed between the pair of slots 450 in the cylindrical outer wall 406. Furthermore, the first and second drive slots 450 are symmetric relative to a central axis C of the drill adapter. When the drill is assembled, the central axis C of the drill adapter 400 and the longitudinal axis A of the drill 100 substantially coincide.

In a preferred embodiment, the drive slots 450 have a drive surface 452 that follows a cylindrical contour. Preferably the cylindrical contour of the drive slots 450 is based on a cylinder diameter that is the same as the diameter of the drive stem 404. Furthermore, the depth of cut of each drive slot 450 in the radial direction preferably is no more than ⅙ the diameter of the drive stem 404. Thus, if the drive stem has a ⅜" diameter and the drive slots follow a ⅜" cylindrical contour, then the narrowest cross-section of the drive stem 404 is ⅔".

As seen in FIG. 4c, when the central cutting insert 300 is mounted onto the drill adapter 400, the rake surfaces 306a, 307a of the central cutting insert 300 are aligned in the axial direction with circumferential sidewalls 446, 444, respectively, which belong to different resilient clamping members. This facilitates chip removal in a direction away from the central cutting insert 300 during drilling operations.

Figure 5:
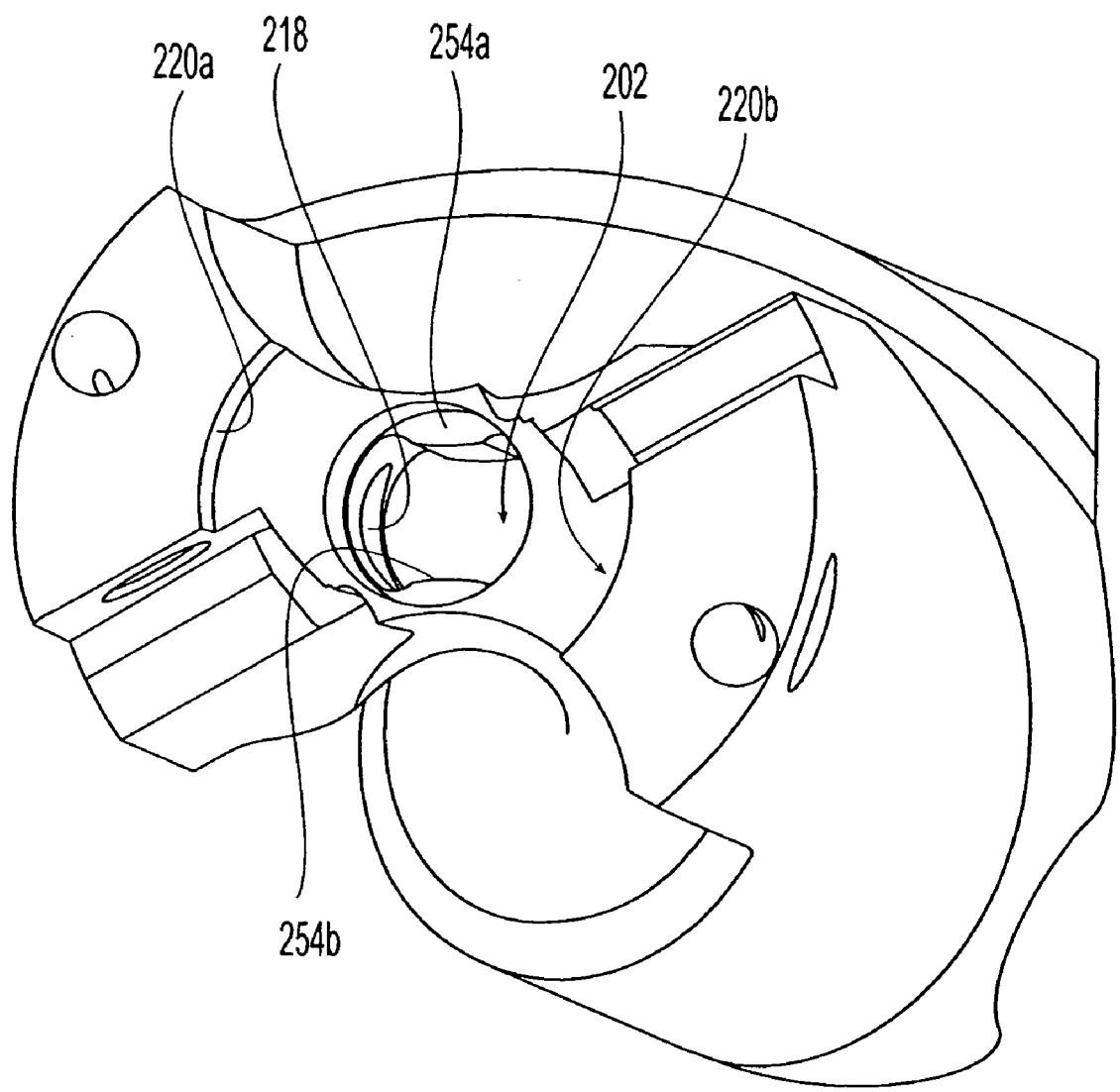
FIG. 5 is perspective end view of the shaft's cutting end portion in without any of the adapter, cutting inserts, clamping screw and set screw.

As seen in FIG. 5, the end bore 202 is designed to accommodate drive stem 404. For this, the inner wall 252 of the end bore is provided with opposing elongated convex guides 254a, 254b that extend along the longitudinal axis A. The opposing convex guides are positioned in the end bore 202 such that a first imaginary line that connects midpoints of the guides 245a, 254b is perpendicular to a second imaginary line that connects midpoints of the radially inwardly directed circumferential seating walls 220a, 220b, in an axial end view of the drill shaft's cutting portion 204. Furthermore, the convex guides are configured and dimensioned to be slidingly received into the drive slots 450 as the drive stem 404, and thus the drill adapter 400, is inserted into the end bore 202. When the drill 100 is rotated, the guides 254a, 254b abut the drive surfaces 452 and impart a rotary force to the drive stem 404.

During assembly, the drill adapter's drive stem is inserted into the end bore 202 with the bearing surface 402 of the drive stem 404 aligned with the set screw bore 218. At the same time, the planar abutment surfaces 440a, 440b come to rest on the drill's lower seating surface 216. Thus, the bottom surface 408 of the drive stem 404 does not rest on the bottom of the end bore 202 and so the depth of the end bore is somewhat deeper than necessary to accommodate the drive stem 404. Once the adapter 400 has been seated, the set screw 122 is turned until it contacts an upper portion of the bearing surface 402. Further tightening of the set screw 122 causes the terminal end of the set screw 122 to ride up the bearing surface 402, causing the adapter 400 to very slightly turn and experience an axially downward force, axially downward movement of the adapter 400 being arrested by the contact between planar abutment surfaces 440a, 440b and the lower seating surface 216.

Figure 6:
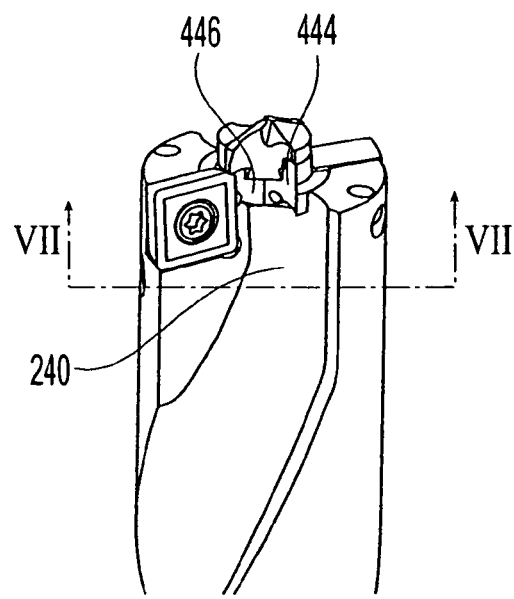
FIG. 6 is a perspective end view of the assembled cutting end portion.
Figure 7:
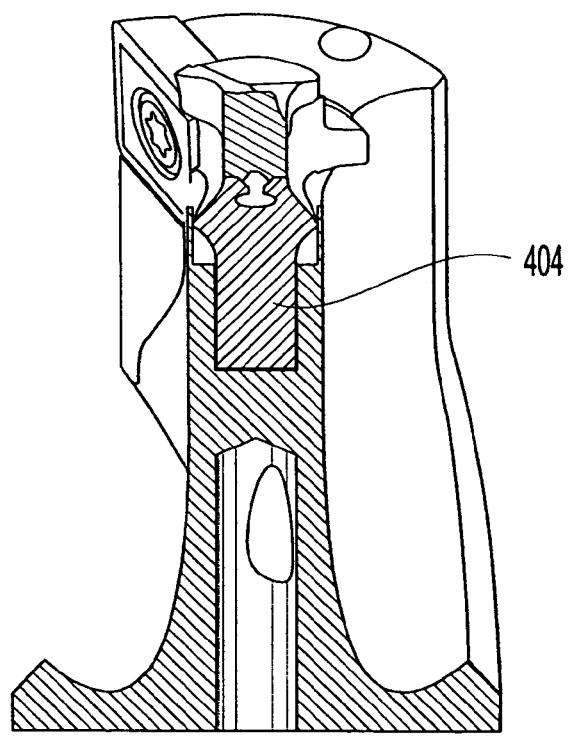
FIG. 7 is a cross-section of the assembled cutting end portion of FIG. 6 along lines VII-VII.

As seen in FIGS. 6 and 7, in the assembled drill, the drive stem 404 must be rotationally positioned in the end bore 202 relative to the drift shaft 104 such that the circumferential sidewalls 444, 446 of the adapter are aligned with the chip gullet 240 so as to facilitate chip flow.

Figure 8:
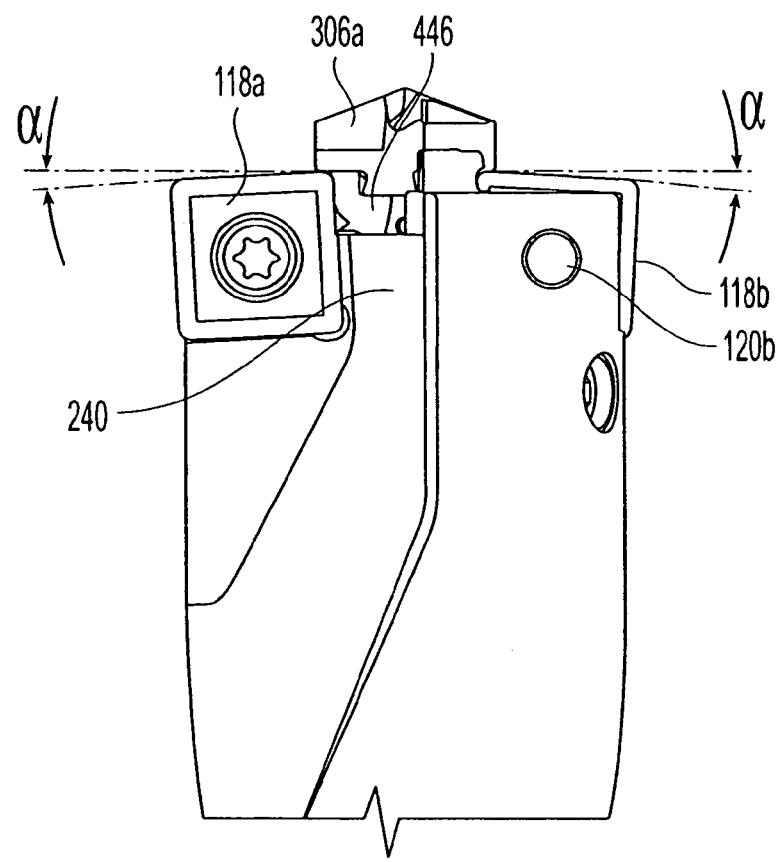
FIG. 8 is a side view of the assembled cutting end portion.

As seen in FIG. 8, in the assembled drill, the upper chip gullet 240 of the drill shaft is axially aligned with a circumferential sidewall 446 of the drill adapter and a rake surface 306a of the central cutting insert 300. Thus, during drilling operations, a chip that is formed by a cutting edge of the central cutting insert 300 can continuously pass from the rake surface 306a to the circumferential sidewall 446 and onto first the upper chip gullet and then to the remainder of the main flute 242. Thus, the present design allows for chip removal that is fairly well unobstructed.

As seen in FIG. 8, the front cutting edges of the lateral cutting inserts 118a are angled backward from a normal to the longitudinal axis by some angle α which preferably is between 1.0°-8.0°. Accordingly, the radially outer leading corners 902a, 902b of the cutting insert have the radially outermost cutting edge surfaces and so the distance therebetween defines the width of the drilled bore.

Figure 9:
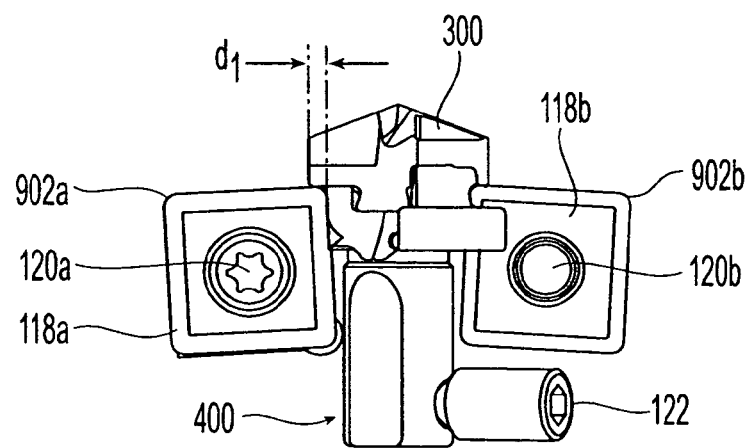
FIG. 9 is a side view of the assembled adapter, cutting inserts, clamping screw and set screw but with the drill shaft absent.

And, as also seen in FIG. 9, the cutting edges of the central cutting insert 300 overlaps the lateral cutting inserts in the radial direction by some distance d1. Preferably d1 is between 0.1 mm and 5 mm, although other overlap distances may also be used. Furthermore, as also suggested by FIG. 9, the lateral cutting inserts 118a, 118b are retained in their respective insert pockets without contacting either the drill adapter or the central cutting insert 300.

Figure 11:
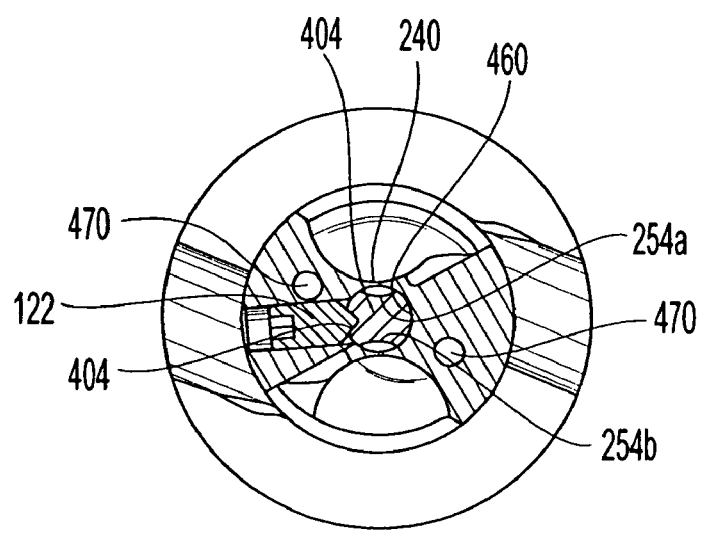
FIG. 11 is a cross-section of the assembled cutting end portion of FIG. 10 along lines XI-XI.

As seen in the radial cross-section of FIG. 11 taken perpendicular to the longitudinal axis A, the set screw 122 enters the concave bearing surface 402, thereby forcing the drive stem 404 against the opposite wall 460 of the end bore 202. As also seen in this figure, the end bore 202 and the set screw bore 218 do not interfere with the internal fluid channels 470 which pass through the drill shaft 104 at its cutting portion 204.

Figure 12:
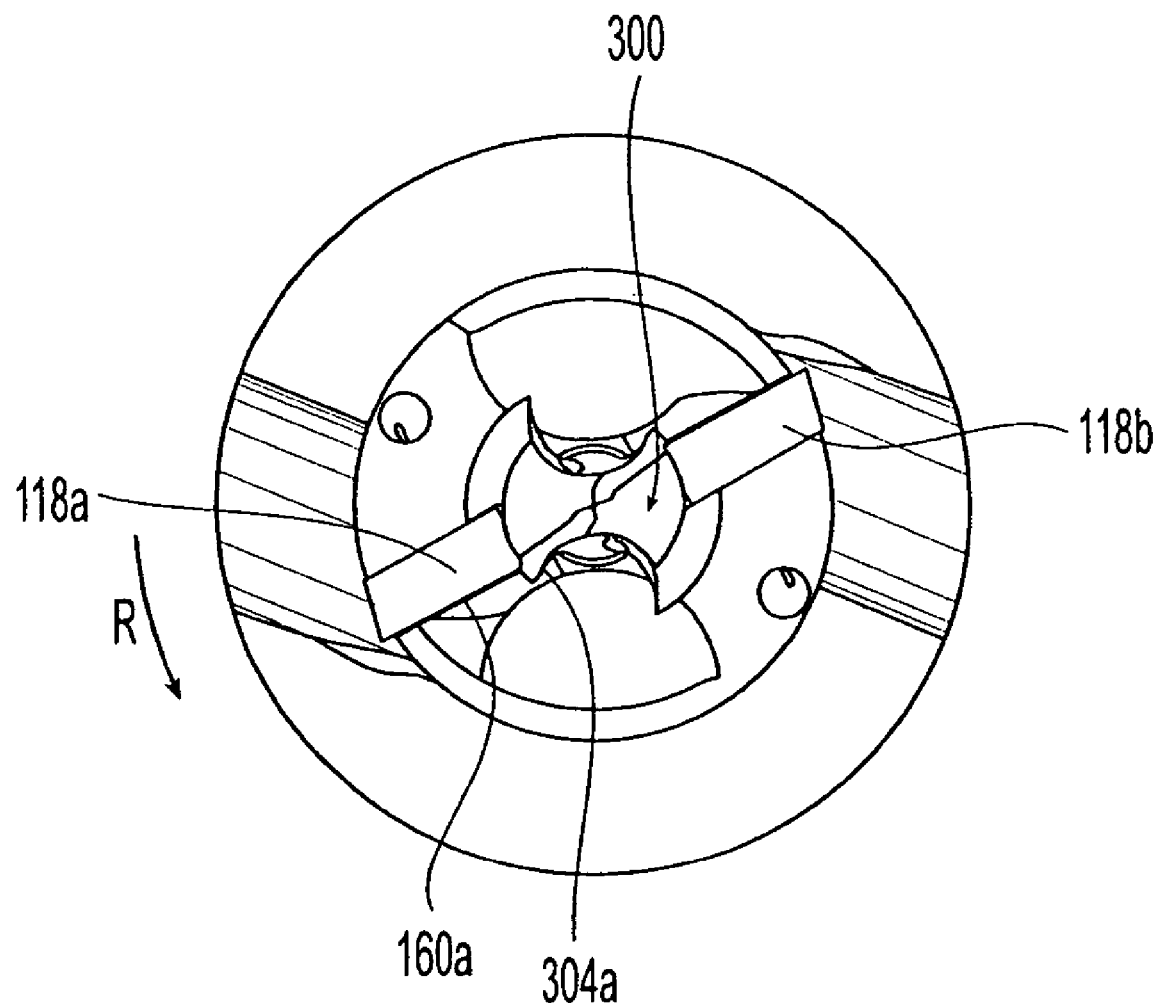
FIG. 12 is an end view of the assembled drill.

With reference to FIG. 12, as seen in the end view of the assembled drill 100, the major cutting edge 304a of the central cutting insert 300 rotationally leads the operative cutting edge 160a of lateral cutting insert 118 as the tool is rotated in the direction indicated by arrow R. Alternatively, it can be said that operative cutting edge 160a of lateral cutting insert lags the major cutting edge 304a. This allows for a chip that initially is cut from a workpiece by the major cutting edge 304a to continue to be formed by the operative cutting edge 160a an instant later. Such a chip, first cut by the central cutting insert 300 and later continued to be cut by the lateral cutting insert 118a, may then be accommodated in the upper chip gullet 240 and a main flute 242 of the drill shaft 104.

Although the present invention has been described to a certain degree of particularity, it should be understood that various alterations and modifications can be made without departing from the spirit or scope of the invention as hereinafter claimed.

What is claimed is:

1. A metal drill adapter having a central axis and comprising a cutting insert retaining portion connected to a drive stem, wherein the cutting insert retaining portion comprises identical first and second resilient clamping members which are rotationally 180° apart, the first and second resilient clamping members being separated by a slit which communicates with an internal through bore extending across a diameter of the cutting insert retaining portion.

2. The metal drill adapter according to claim 1, further comprising a pair of planar abutment surfaces formed on an underside of the cutting insert retaining portion, wherein the planar abutment surfaces extend radially outward of the drive stem.

3. A metal drill adapter having a central axis and comprising a cutting insert retaining portion connected to a drive stem, wherein the drive stem comprises a cylindrical outer surface in which are formed:
   a pair of elongated drive slots that extend along the central axis and communicate with a bottom surface of the drive stem; and
   a bearing surface between the pair of elongated drive slots;
   wherein the cutting insert retaining portion comprises identical first and second resilient clamping members which are rotationally 180° apart, the first and second resilient clamping members being separated by a slit which communicates with an internal through bore extending across a diameter of the cutting insert retaining portion.

4. The metal drill adapter according to claim 3, wherein the resilient clamping members both have first and second curved circumferential sidewalls, the first circumferential sidewall of one resilient clamping member being separated from the second circumferential sidewall of the other resilient clamping member by the slit.

5. A metal drill adapter in combination with a first cutting insert, wherein:
   (a) the drill adapter has a central axis and comprises a cutting insert retaining portion connected to a drive stem, wherein the cutting insert retaining portion comprises identical first and second resilient clamping members which are rotationally 180° apart, the first and second resilient clamping members being separated by a slit which communicates with an internal through bore extending across a diameter of the cutting insert retaining portion;
   (b) the first cutting insert is retained in the drill adapter's cutting insert retaining portion; and
   (c) the first cutting insert has at least one cutting edge provided with an associated rake surface and the drill adapter has a curved circumferential sidewall, the associated rake surface merging with the curved circumferential sidewall.

6. The metal drill adapter in combination with a cutting insert according to claim 5, further comprising a pair of planar abutment surfaces formed on an underside of the cutting insert retaining portion, wherein the planar abutment surfaces extend radially outward of the drive stem.

7. A metal drill assembly comprising:
a drill shaft having a longitudinal axis and a cutting portion provided with an end bore that is coaxial with said longitudinal axis, the end bore having an inner wall provided with a plurality of elongated convex guides that extend along the longitudinal axis; and
a drill adapter having a central axis and comprising a cutting insert retaining portion connected to a drive stem, wherein the drive stem comprises a cylindrical outer surface in which are formed:
a pair of elongated drive slots that extend along the central axis and communicate with a bottom surface of the drive stem; and
a bearing surface between the pair of elongated drive slots;
wherein:
the drive stem is positioned in the end bore with the elongated convex guides received into the elongated drive slots.

8. The metal drill assembly according to claim 7, wherein:
the drill adapter further comprises a pair of planar abutment surfaces formed on an underside of the cutting insert retaining portion; and
the planar abutment surfaces extend radially outward of the drive stem and abut an axially directed seating surface of the drill shaft, the end bore being formed in said axially directed seating surface.

9. The metal drill assembly according to claim 7, wherein:
the drill shaft is provided with a set screw bore extending in a direction transverse to the longitudinal axis, the set screw bore connecting an outer surface of the drill shaft with the end bore;
the drive stem is provided with a bearing surface formed in the cylindrical outer surface, between the pair of elongated drive slots; and
the drill assembly further comprises a set screw that occupies the set screw bore and applies a force against the bearing surface.

10. A metal drill assembly comprising:
a drill shaft having a longitudinal axis and a cutting portion provided with an end bore that is coaxial with said longitudinal axis;
a drill adapter having a central axis and comprising a cutting insert retaining portion connected to a drive stem, wherein:
the drive stem is positioned in the end bore and secured therein; and
the cutting insert retaining portion comprises identical first and second resilient clamping members which are rotationally 180° apart, the first and second resilient clamping members being separated by a slit which communicates with an internal through bore extending across a diameter of the cutting insert retaining portion.

11. The metal drill assembly according to claim 10, wherein the drill shaft is further provided with first and second lateral cutting insert pockets that are rotationally 180° apart and positioned on either side of the drill adapter, wherein:
each of said lateral cutting insert pockets comprises:
a pocket base that does not contain the longitudinal axis but is substantially parallel thereto;
an axially directed rear wall; and
a radially directed side wall.

12. The metal drill assembly according to claim 10, wherein the resilient clamping members both have first and second curved circumferential sidewalls, the first circumferential sidewall of one resilient clamping member being separated from the second circumferential sidewall of the other resilient clamping member by the slit.

13. The metal drill assembly according to claim 12, wherein:
the drill shaft further comprises a chip gullet; and
said first circumferential sidewall of one resilient clamping member and said second circumferential sidewall of the other resilient clamping member are aligned with said chip gullet.

14. A metal drill comprising:
a drill shaft having a longitudinal axis and a cutting portion provided with an end bore that is coaxial with said longitudinal axis, the end bore having an inner wall provided with a plurality of elongated convex guides that extend along the longitudinal axis;
a drill adapter having a central axis and comprising a cutting insert retaining portion connected to a drive stem, wherein the drive stem comprises a cylindrical outer surface in which are formed:
a pair of elongated drive slots that extend along the central axis and communicate with a bottom surface of the drive stem; and
a bearing surface between the pair of elongated drive slots; and
a first cutting insert retained in said cutting insert retaining portion, wherein:
the drive stem is positioned in the end bore with the elongated convex guides received into the elongated drive slots.

15. The metal drill according to claim 14, wherein:
the drill adapter further comprises a pair of planar abutment surfaces formed on an underside of the cutting insert retaining portion; and
the planar abutment surfaces extend radially outward of the drive stem and abut an axially directed seating surface of the drill shaft, the end bore being formed in said axially directed seating surface.

16. A metal drill according to claim 14, wherein
the drill shaft is provided with a set screw bore extending in a direction transverse to the longitudinal axis, the set screw bore connecting an outer surface of the drill shaft with the end bore;
the drive stem is provided with a bearing surface formed in the cylindrical outer surface, between the pair of elongated drive slots; and
the drill assembly further comprises a set screw that occupies the set screw bore and applies a force against the bearing surface.

17. A metal drill comprising:
a drill shaft having a longitudinal axis and a cutting portion provided with an end bore that is coaxial with said longitudinal axis;
a drill adapter having a central axis and comprising a cutting insert retaining portion connected to a drive stem; and
a first cutting insert retained in said cutting insert retaining portion; wherein:
the drive stem is positioned in the end bore and secured therein; and
the cutting insert retaining portion comprises identical first and second resilient clamping members which are rotationally 180° apart, the first and second resilient clamping members being separated by a narrow slit which communicates with an internal through bore extending across a diameter of the cutting insert retaining portion.

18. The metal drill according to claim 17, wherein the drill shaft is further provided with first and second lateral cutting insert pockets that are rotationally 180° apart, wherein:

each of said lateral cutting insert pockets comprises:
a pocket base that does not contain the longitudinal axis but is substantially parallel thereto;
an axially directed rear wall; and
a radially directed side wall; and
an indexable second cutting insert is retained in each of said lateral cutting insert pockets, the indexable second cutting insert is dissimilar to the first cutting insert retained in the cutting insert retaining portion.

19. The metal drill according to claim 18, wherein each indexable second cutting insert is square-shaped and is four-way indexable.

20. The metal drill according to claim 17, wherein the resilient clamping members both have first and second curved circumferential sidewalls, the first circumferential sidewall of one resilient clamping member being separated from the second circumferential sidewall of the other resilient clamping member by the slit.

21. The metal drill according to claim 20, wherein:
the drill shaft further comprises a chip gullet; and
said first circumferential sidewall of one resilient clamping member and said second circumferential sidewall of the other resilient clamping member are aligned with said chip gullet.

22. The metal drill according to claim 20, wherein:
the first cutting insert has at least one cutting edge provided with an associated rake surface;
the associated rake surface is aligned with at least one of said first and second curved circumferential sidewalls;
the drill shaft further comprises a chip gullet; and
said first circumferential sidewall of one resilient clamping member and said second circumferential sidewall of the other resilient clamping member are aligned with said chip gullet.

23. A metal drill having a longitudinal axis and comprising:
a drill shaft having a cutting portion provided with an end bore that is coaxial with said longitudinal axis, the drill shaft further having first and second lateral cutting insert pockets formed on either side of the end bore;
a drill adapter having a cutting insert retaining portion and a drive stem, said drive stem being removably retained in the end bore;
a cutting insert of a first type screwlessly retained in the cutting insert retaining portion; and
first and second indexable cutting inserts of a second type secured to respective first and second lateral cutting insert pockets and positioned on either side of said cutting insert of a first type.

24. The metal drill according to claim 23, wherein
the end bore has an inner wall provided with a plurality of elongated convex guides that extend along the longitudinal axis;
the drive stem comprises a cylindrical outer surface in which are formed:
a pair of elongated drive slots that extend along the central axis and communicate with a bottom surface of the drive stem; and
a bearing surface between the pair of elongated drive slots; and the drive stem is positioned in the end bore with the elongated convex guides received into the elongated drive slots.

25. The metal drill according to claim 24, wherein:
the drill adapter further comprises a pair of planar abutment surfaces formed on an underside of the cutting insert retaining portion; and
the planar abutment surfaces extend radially outward of the drive stem and abut an axially directed seating surface of the drill shaft, the end bore being formed in said axially directed seating surface.

26. A metal drill according to claim 24, wherein
the drill shaft is provided with a set screw bore extending in a direction transverse to the longitudinal axis, the set screw bore connecting an outer surface of the drill shaft with the end bore;
the drive stem is provided with a bearing surface formed in the cylindrical outer surface, between the pair of elongated drive slots; and
the drill assembly further comprises a set screw that occupies the set screw bore and applies a force against the bearing surface.

27. The metal drill according to claim 23, wherein each of said lateral cutting insert pockets comprises:
a pocket base that does not contain the longitudinal axis but is substantially parallel thereto;
an axially directed rear wall; and
a radially directed side wall.

28. The metal drill according to claim 23, wherein each of indexable cutting inserts of a second type is square-shaped and is four-way indexable.

29. The metal drill according to claim 23, wherein the cutting insert retaining portion comprises identical first and second resilient clamping members which are rotationally 180° apart, the first and second resilient clamping members being separated by a narrow slit which communicates with an internal through bore extending across a diameter of the cutting insert retaining portion.

30. The metal drill according to claim 29, wherein the resilient clamping members both have first and second curved circumferential sidewalls, the first circumferential sidewall of one resilient clamping member being separated from the second circumferential sidewall of the other resilient clamping member by the slit.

31. The metal drill according to claim 30, wherein:
the drill shaft further comprises a chip gullet; and
said first circumferential sidewall of one resilient clamping member and said second circumferential sidewall of the other resilient clamping member are aligned with said chip gullet.

32. The metal drill according to claim 30, wherein:
said cutting insert of a first type has at least one cutting edge provided with an associated rake surface;
the associated rake surface is aligned with at least one of said first and second curved circumferential sidewalls;
the drill shaft further comprises a chip gullet; and
said first circumferential sidewall of one resilient clamping member and said second circumferential sidewall of the other resilient clamping member are aligned with said chip gullet.

* * * * *